(12) United States Patent
Conlon et al.

(10) Patent No.: US 8,068,947 B2
(45) Date of Patent: *Nov. 29, 2011

(54) RANGE MAXIMIZATION OF A HYBRID VEHICLE OPERATING IN AN ELECTRIC VEHICLE OPERATING STATE

(75) Inventors: Brendan M. Conlon, Rochester Hills, MI (US); Alan G. Holmes, Clarkston, MI (US); Edward D. Tate, Jr., Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1048 days.

This patent is subject to a terminal disclaimer.

(21) Appl. No.: 11/940,517

(22) Filed: Nov. 15, 2007

(65) Prior Publication Data

US 2008/0125928 A1 May 29, 2008

Related U.S. Application Data

(60) Provisional application No. 60/861,638, filed on Nov. 28, 2006.

(51) Int. Cl.
*G05D 3/00* (2006.01)

(52) U.S. Cl. .................. 701/22; 701/51; 701/54; 475/5; 903/903; 180/65.21

(58) Field of Classification Search .................... 701/22, 701/51, 53, 54, 84, 87; 903/903; 475/5, 475/271, 291; 477/3, 5; 180/65.1, 65.21, 180/65.29
See application file for complete search history.

(56) References Cited

U.S. PATENT DOCUMENTS

2007/0068714 A1* 3/2007 Bender .................. 180/65.4

FOREIGN PATENT DOCUMENTS

JP 2001-314004 A 11/2001

* cited by examiner

*Primary Examiner* — Gertrude Arthur Jeanglaude

(57) ABSTRACT

A vehicle has a powertrain including an engine and at least one electric machine. A method for maximizing range capability of the vehicle while operating in an electric vehicle operating state includes determining an incipient electric vehicle operating state of the powertrain, setting a preferred charge/discharge rate of an electric energy storage device to a maximum charging rate, and controlling the powertrain to an operating state including an engine state that is ON to effect charging the electrical energy storage device based on the maximum charging rate.

23 Claims, 6 Drawing Sheets

RANGE MAXIMIZATION OF A HYBRID VEHICLE OPERATING IN AN ELECTRIC VEHICLE OPERATING STATE

CROSS REFERENCE TO RELATED APPLICATIONS

This application claims priority from U.S. Provisional Application No. 60/861,638, filed on Nov. 28, 2006, which is hereby incorporated herein by reference.

TECHNICAL FIELD

This disclosure pertains to hybrid powertrain systems.

BACKGROUND

The statements in this section merely provide background information related to the present disclosure and may not constitute prior art.

Powertrain architectures for vehicles comprise torque-generative devices, including internal combustion engines and electric machines, which transmit mechanical torque through a transmission device to an output. Known engines can also generate torque which may be transmitted to the electric machine to generate electric power, which is storable as electrical energy potential in an on-board electrical energy storage device. An electrical energy storage device can be electrically coupled to a remote power supply for electrical charging during a period when the vehicle is static, e.g., parked.

SUMMARY

A vehicle has a powertrain including an engine and at least one electric machine. A method for maximizing range capability of the vehicle while operating in an electric vehicle operating state includes determining an incipient electric vehicle operating state of the powertrain, setting a preferred charge/discharge rate of an electric energy storage device to a maximum charging rate, and controlling the powertrain to an operating state including an engine state that is ON to effect charging the electrical energy storage device based on the maximum charging rate.

BRIEF DESCRIPTION OF THE DRAWINGS

The disclosure may take physical form in certain parts and arrangement of parts, embodiments of which are described in detail and illustrated in the accompanying drawings which form a part hereof, and wherein.

DETAILED DESCRIPTION

Figure 1:
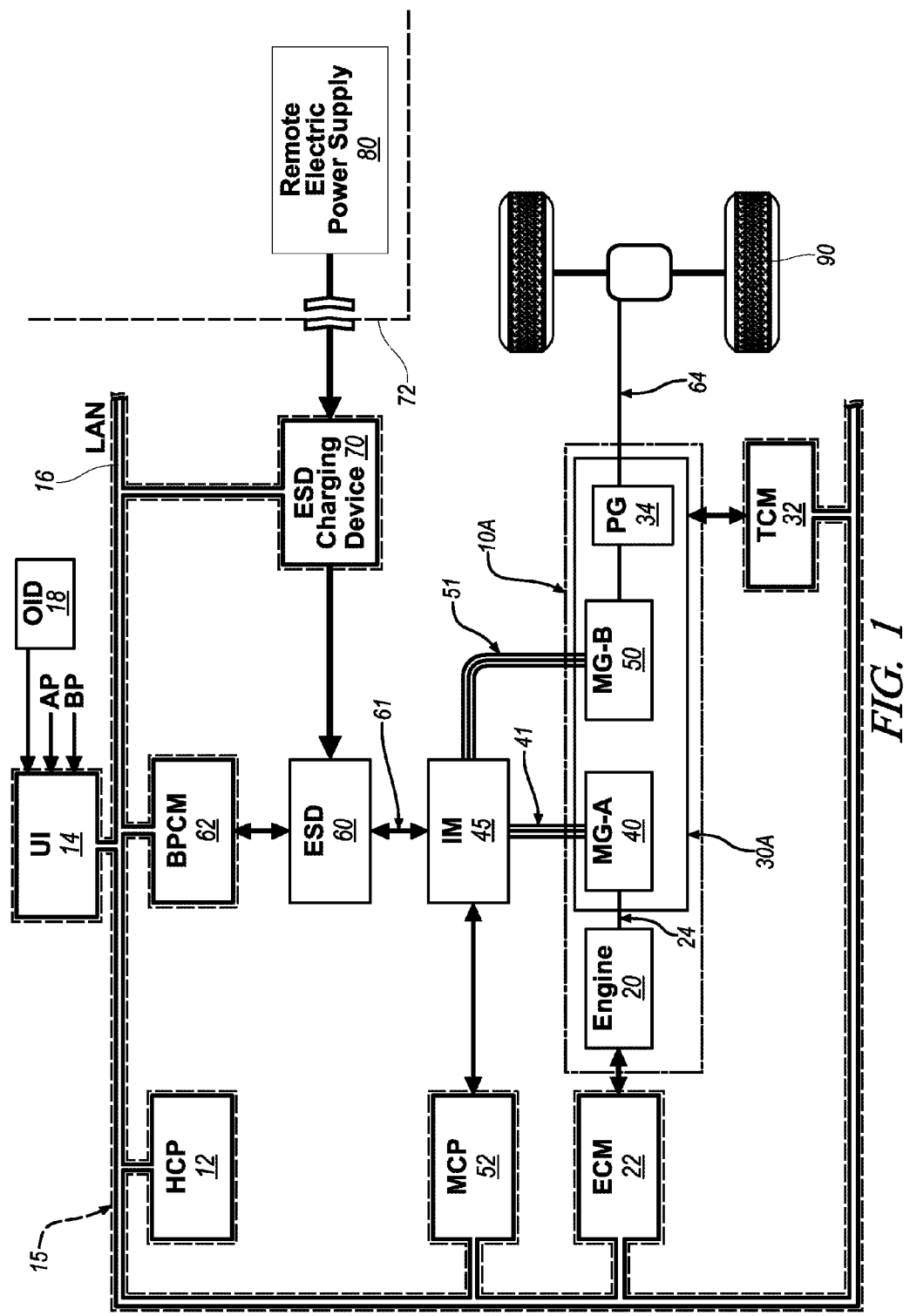
FIGS. 1 and 2 are schematic diagrams of exemplary powertrain and control systems, in accordance with the present disclosure.

Referring now to the drawings, wherein the depictions are for the purpose of illustrating certain exemplary embodiments only and not for the purpose of limiting the same, and wherein like elements among the exemplary embodiments and drawings are numbered alike, FIG. 1 depicts an embodiment of a powertrain system 10A and control system 15 operative to transmit torque to a transmission output member 64, e.g., to a transmission output shaft, which is connected to a driveline 90 of a vehicle. The powertrain system 10A includes an internal combustion engine 20 and an electro-mechanical transmission 30A including a first electric machine ('MG-A') 40, a second electric machine ('MG-B') 50, and a planetary or parallel shaft reduction gear set ('PG') 34. The first and second electric machines 40 and 50 are depicted as being integrated into the transmission 30A, although the disclosure is not so limited. An electric energy storage device (hereafter 'ESD') 60 is electrically coupled to an inverter module ('IM') 45, described hereinbelow, and an ESD charging device 70. The ESD charging device 70 is selectively coupled to a remote electric power supply 80 via an electrical connector 72 when the vehicle is in a static position. The engine 20 operatively couples to the first electric machine 40 via a transmission input shaft 24 to generate electric power. The second electric machine 50 operatively couples to the transmission output member 64 via the gear set 34 as shown, or directly without an intervening gearset. The second electric machine 50 may transmit tractive torque through the transmission 30A to the driveline 90 for vehicle propulsion and for regenerative braking. The driveline 90 may comprise a front-wheel drive system including a transaxle and half-shafts connected to drive wheels, a rear-wheel drive system including a differential and axles connected to drive wheels, and other driveline configurations, none of which are shown in detail.

The control system 15 provides coordinated system control of the powertrain system 10A by controlling operation of the engine 20, transmission 30A, and the first and second electric machines 40 and 50, including controlling operation of the powertrain system 10A in one of a plurality of powertrain operating states. The control system 15 comprises a hybrid control module (hereafter 'HCP') 12, an engine control module (hereafter 'ECM') 22, transmission control module (hereafter 'TCM') 32, motor control module (hereafter 'MCP') 52, and battery pack, or ESD control module (hereafter 'BPCM') 62. The control system 15 receives operator demands and other inputs from an operator interface module ('UI') 14 via a local area network (hereafter 'LAN') bus connection 16.

Transmission 30A selectively transmits power among the engine 20, the first electric machine 40, the second electric machine 50, and the driveline 90 via the gear set 34, including selectively applying torque transfer devices, hereafter referred to as clutches (not shown) but intended to include all varieties of torque transfer devices including, for example, wet and dry clutches, band clutches, and brakes. The transmission 30A is controlled by the TCM 32. The TCM 32 is signally and operatively coupled to the transmission 30A and functions to acquire data from sensors (not shown) and provide command signals. The TCM 32 determines clutch torques, monitors rotational output speed from a transmission output sensor (not shown), and monitors outputs from hydraulic pressure sensing devices (not shown) in the transmission. The TCM 32 selectively controls pressure control solenoids (not shown) and shift solenoids (not shown) to control the torque transfer clutches to achieve one of the powertrain operating states.

The engine 20 preferably comprises a multi-cylinder internal combustion engine operative to generate and transmit torque to the first electric machine 40. The engine 20 can be of a spark-ignition type, a compression-ignition type, or other operating cycle, utilizing available fuels, including but not limited to gasoline, diesel, and alcohol-based fuels. The engine 20 is controlled by the ECM 22, which is signally and operatively coupled to the engine 20, and functions to acquire data from a variety of sensors (not shown) and control a variety of actuators (not shown) over a plurality of discrete lines (not shown). Acquired data includes input from a crankshaft position sensor (not shown) to provide engine speed. Other parameters sensed by ECM 22 include engine coolant temperature, manifold pressure, ambient air temperature, and ambient pressure, all of which are not shown. Various actuators that may be controlled by the ECM 22 include fuel injectors, ignition modules, and throttle control modules, all of which are not shown. The ECM 22 is operative to control the engine 20 to engine states comprising an engine on state ('ON'), i.e., the engine is fueled and firing, and an engine off state ('OFF'), i.e., the engine is not fueling and is not firing. The ECM 22 can shut off and subsequently restart the engine 20 during ongoing vehicle operation. The ECM 22 communicates with other control modules via the LAN bus 16.

The first and second electric machines 40 and 50 are three-phase AC electric machines electrically coupled to and controlled by the inverter module 45. The first electric machine 40 preferably comprises a rotor (not shown) and stator (not shown), with the rotor operatively connected to the transmission input shaft 24 and the stator grounded to a case (not shown) of the transmission 30A. The second electric machine 50 preferably comprises a rotor (not shown) and stator (not shown), with the rotor operatively connected to the transmission output member 64 via the gear set 34 as depicted, although the disclosure is not so limited. The stator is grounded to the case of the transmission 30A.

The inverter module 45 is high voltage DC-coupled to the ESD 60 via transfer conductors 61. The inverter module 45 preferably comprises a pair of complementary three-phase power inverters (not shown) adapted to transmit electric power to and from the first and second electric machines 40 and 50 via transfer conductors 41 and 51 respectively. The three-phase power inverters each preferably comprises a plurality of semiconductor power switching devices, e.g., insulated gate bipolar transistors ('IGBTs') (not shown) that form a switch mode power supply configured to receive control commands from the MCP 52. There is typically one pair of IGBTs for each phase of each of the three-phase electric machines. States of the IGBTs are controlled to provide motor drive or electric power regeneration functionality. The three-phase inverters receive (or supply) DC electric power via transfer conductors 41 and transform it to (or from) three-phase AC power, which is conducted to (or from) the first and second electric machines 40 and 50 for operation as motors (or generators).

The MCP 52 controls the inverter module 45 to achieve desired motor torques. The MCP 52 controls the IGBTs of the inverter module 45 to control transmission of electrical power to and from the first electric machine 40 via transfer conductors 41, and to control transmission of electrical power to and from the second electric machine 50 via transfer conductors 51. Electrical current is transmitted to and from the ESD 60 via transfer conductor 61 in accordance with whether the inverter module 45 is charging or discharging the ESD 60 during vehicle operation.

The ESD 60 comprises a high-voltage electrical energy storage device, (e.g., one or more batteries or ultracapacitors, or combinations thereof), preferably batteries for storing and supplying electrical energy for use during operation of the powertrain. The BPCM 62 is signally coupled to one or more sensors (not shown) for monitoring electrical current, voltage, and temperature of the ESD 60 to determine parametric states of the batteries. Such parametric states include battery state of charge, amp-hour throughput, voltage, available electrical power, and device temperature. The ESD 60 is electrically coupled to ESD charging device 70 which is couplable via the electrical connector 72 to the remote electric power supply 80 when the vehicle is in a static position. The ESD charging device 70 converts AC electrical power to DC electrical power and transfers it to the ESD 60. The electric connector 72 may electrically couple current ohmically through conductive contacts or inductively through known inductive coupling devices. Known remote electric power supplies 80 include a stationary electrical grid for supplying electric power to residential and commercial consumers.

The operator interface module 14 is operatively coupled to a plurality of devices through which demands from the vehicle operator are determined to control and direct operation of the powertrain system 10A. The devices may include an accelerator pedal ('AP') and a brake pedal ('BP') from which an operator torque request is determined, a transmission gear selector (not shown), and a vehicle speed cruise control (not shown). The transmission gear selector has a discrete number of operator-selectable positions, including direction of the transmission output member 64, i.e., one of a forward and a reverse direction. An operator interface device ('OID') 18 may include a control panel comprising a plurality of elements, e.g., a touch-activated visual display screen, operator selectable or operator-adjustable buttons, switches, and knobs, none of which are shown. The operator interface device 18 is preferably located in a console accessible to the vehicle operator, and receives control inputs from the operator, including an input requesting powertrain operation in an electric vehicle ('EV') operating state, and communicates information to the operator. The operator interface device 18 can be an element of an on-board navigation system which can include a global positioning system (GPS), and a wireless communications system, none of which are shown. The on-board navigation system and global positioning system can provide signal inputs to the control system 15 useable for operating the powertrain system 10.

The HCP 12 provides supervisory control of the powertrain system, serving to coordinate operation of the ECM 22, TCM 32, MCP 52, and BPCM 62. These control modules comprise a subset of an overall vehicle control architecture, and comprise the control system 15 which provides coordinated system control of the powertrain system 10. As described in detail hereinbelow, the control system 15 synthesizes the inputs to determine operator demands and operating conditions, and executes algorithms to control various actuators to achieve control targets for certain parameters including fuel economy, emissions, performance, and drivability, and to protect powertrain system hardware. Based upon various input signals from the operator interface module 14 and the powertrain, including the ESD 60, the control system 15 generates various commands, including: the operator torque request; a commanded output torque to driveline 90; the engine input torque; clutch torques for the torque transfer clutches of the transmission 30; and motor torque commands for the first and second electric machines 40 and 50.

The aforementioned control modules may communicate with other control modules, sensors, and actuators via the LAN bus 16, as described herein. The LAN bus 16 facilitates structured communication between the various control modules consisting of sensor outputs, control parameters, and device commands. The communication protocol utilized is application-specific. The LAN bus 16 provides for robust messaging and interfacing between the aforementioned control modules, and other control modules providing functionality such as antilock brakes, traction control, and vehicle stability. Multiple communications buses may be used to improve communications speed and provide signal redundancy and integrity.

Each of the aforementioned control modules is preferably a general-purpose digital computer comprising a microprocessor or central processing unit, storage mediums comprising read only memory ('ROM'), random access memory ('RAM') and electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each control module has a set of control algorithms, comprising resident executable program instructions and calibrations stored in ROM and executed to provide the respective functions of each computer. Information transfer between the various computers is preferably accomplished using the aforementioned LAN bus 16.

Algorithms for controlling the powertrain system 10 and estimating parametric states are executed during preset loop cycles such that each algorithm is executed at least once each loop cycle. The algorithms are stored in the non-volatile memory devices, and are executed by one of the central processing units to monitor inputs from the sensing devices and execute control and diagnostic routines to control operation of the respective device, using preset calibrations. Loop cycles are executed at regular intervals, for example each 3.125, 6.25, 12.5, and 100 milliseconds during ongoing engine and vehicle operation. Alternatively, algorithms may be executed in response to occurrence of an event.

The powertrain system 10A depicted with reference to FIG. 1 is selectively operative in one of several powertrain operating states by controlling the engine state and operating the second electric machine 40 to generate tractive torque which can be transmitted to the driveline 90, as detailed in Table 1.

TABLE 1

| Powertrain Operating State | Tractive Torque Generator | Engine State |
| --- | --- | --- |
| EV | second electric machine | OFF |
| EV-C | second electric machine | ON |
| C | No tractive torque generation | ON |

In an electric vehicle ('EV') operating state, the second electric machine 50 generates the tractive torque, and the engine state is OFF. The engine 20 and first electric machine 40 are preferably disconnected from the transmission output member 64. In an electric vehicle with charging ('EV-C') operating state, the second electric machine 50 generates the tractive torque, and the engine state is ON, generating power for charging the ESD 60 via the first electric machine 40. In a charging ('C') operating state, the engine state is ON, generating power for charging the ESD 60 via the first electric machine 40, and there is no tractive torque generated. Electrical power can be regenerated during braking or coasting events, regardless of the powertrain operating state.

Figure 2:
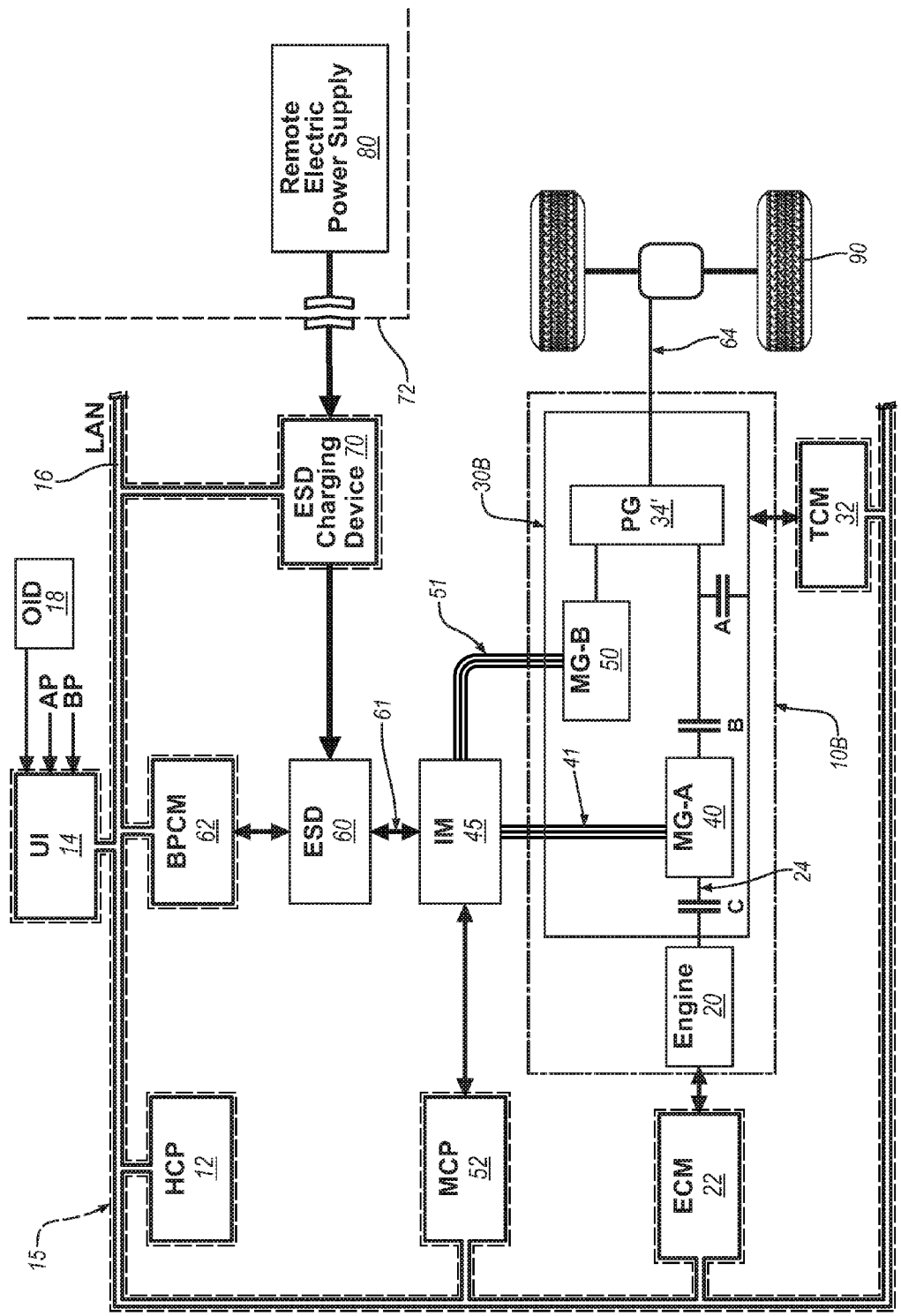

FIG. 2 depicts a second embodiment of a powertrain system 10B and the control system 15. The powertrain system 10B includes the engine 20 and an electro-mechanical transmission 30B including first and second electric machines 40 and 50, a gear set ('PG') 34', which preferably comprises a planetary gear set, and selectively engageable clutches A, B, and C. A first gear member of the gearset 34' is connected to the second electric machine 50. A second gear member of the gearset 34' is connected to the transmission output member 64. A third gear member of the gearset 34' may be selectively connected to the transmission case (i.e. grounded) by applying clutch A. The third gear member of the gearset 34' may be selectively connected to the first electric machine 40 by applying clutch B. And, the engine 20 is connected to the transmission input member 24 which may be selectively connected to the first electric machine 40 by applying clutch C.

The powertrain system 10B depicted with reference to FIG. 2 is selectively operative in one of several powertrain operating states by controlling the engine state and operating the first and second electric machines 40 and 50 to generate tractive torque which can be transmitted to the driveline 90 through selectively applied clutches, as detailed in Table 2.

TABLE 2

| Powertrain Operating State | Clutch Applied | Tractive Torque Generator | Engine State |
| --- | --- | --- | --- |
| EV1 | A | second electric machine | OFF |
| EV2 | B | first and second electric machines | OFF |
| EVT | B, C | engine, first and second electric machines | ON |
| EV1-C | A, C | second electric machine | ON |
| Charging | C | No tractive torque generation | ON |

In a first electric vehicle ('EV1') operating state, the second electric machine 50 generates the tractive torque transmitted to the driveline 90, and the engine state is OFF. The engine 20 and first electric machine 40 are preferably disconnected from the transmission in an electric vehicle operating state. In a second electric vehicle ('EV2') operating state, the first and second electric machines 40 and 50 generate the tractive torque, and the engine state is OFF. In an electrically variable transmission ('EVT') operating state, the engine state is ON, and the engine 20 and the first and second electric machines 40 and 50 generate the tractive torque. In a first electric vehicle with electric charging ('EV1-C') operating state (alternatively referred to as series hybrid operating state), the second electric machine 50 generates the tractive torque. The engine 20 and first electric machine 40 are disconnected from the driveline 90, and the engine state is ON, generating power for charging the ESD 60 through the first electric machine 40. In a charging operating state, the engine state can be ON, and the engine 20 generates power for charging the ESD 60 through the first electric machine 40, and is disconnected from the driveline 90, i.e., no tractive torque is transmitted to the driveline 90 from the engine 20. Furthermore, the first electrical machine 40 can be controlled to start the engine 20, e.g., in the charging operating state. Electrical power can be regenerated during braking or coasting events, regardless of the powertrain operating state.

Figure 3:
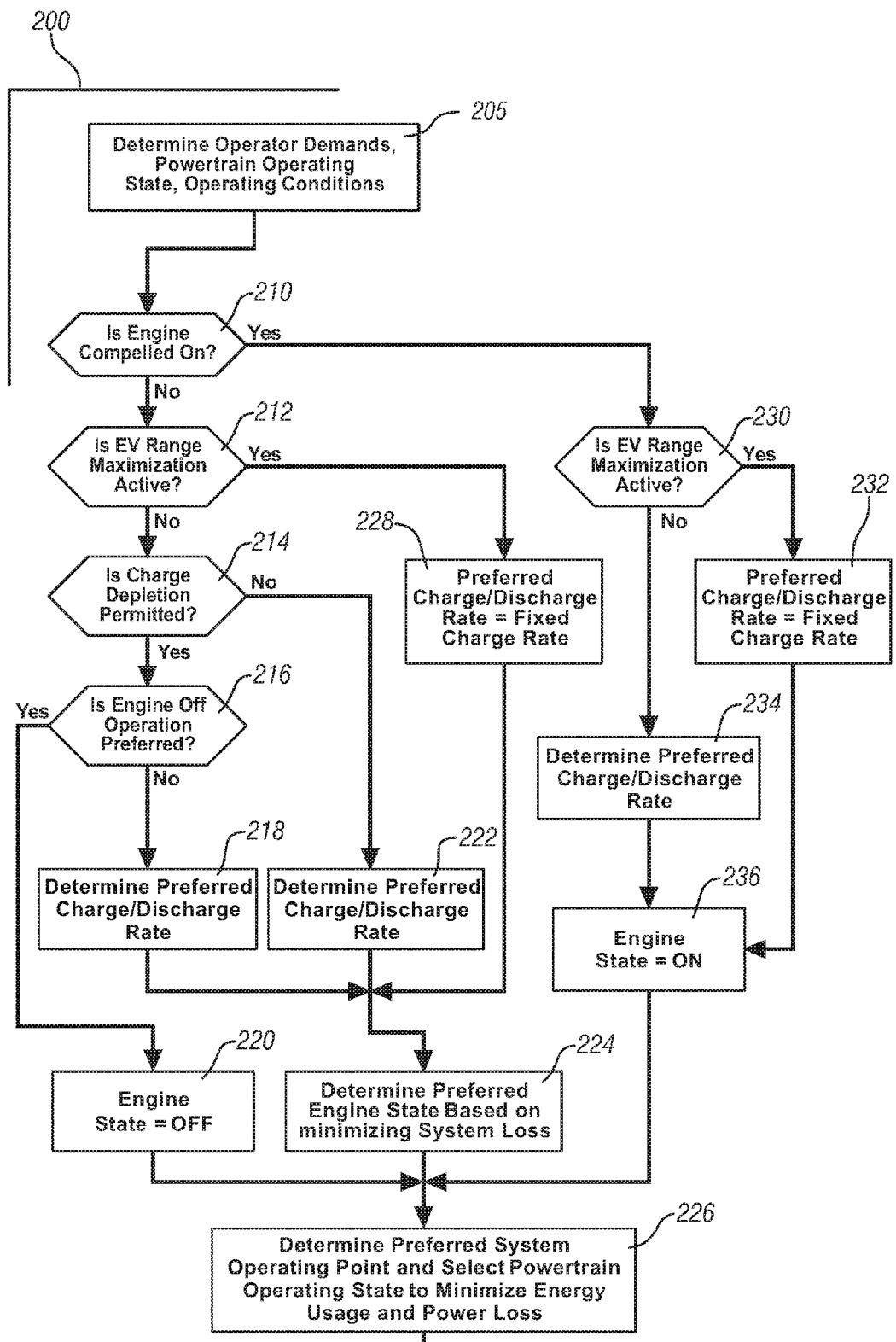
FIG. 3 is a schematic diagram of a logic flowchart, in accordance with the present disclosure.

FIG. 3 depicts a control routine 200, executable as program code comprising one or more algorithms in one or more of the control modules during the preset loop cycles, to operate the powertrain system 10, such as the exemplary embodiments shown with reference to FIGS. 1, 2, 4, 5, and 6. Overall the control routine 200 includes determining operator demands, the current powertrain operating state, and vehicle operating conditions based upon the operating demands. An operating strategy is selected, based upon the operator demands, the current powertrain operating state, and the operating conditions. The powertrain system 10 is controlled to one of the powertrain operating states to transmit power, in the forms of driveline tractive torque and electric power generation, based upon the operating strategy and the operator demands, the powertrain operating state, and the operating conditions. A person having ordinary skill in the art will understand that the control routine 200 described herein is applicable to various electro-mechanical hybrid powertrain configurations, including series-hybrid systems, parallel-hybrid systems, power-split hybrid systems, and others. This includes systems wherein the engine 20 and the first electric machine 40 are mounted remotely from the transmission 30.

During vehicle operation, the operator demands are monitored, preferably through the operator interface module 14. The current powertrain operating state and current operating conditions are determined (205).

The control system 15 determines whether the operator demands and operating conditions dictate selecting an operating strategy that includes compelling engine operation (210), which includes setting the engine state to ON (236). The control system 15 may compel engine operation whenever the available battery power or energy falls below preset thresholds, e.g., as determined by the state of charge of the ESD 60. The preset threshold for the state of charge of the ESD 60 may be determined based upon vehicle speed and the operator torque request. Estimates of available battery power and energy are determined, preferably in the BPCM 62, based on battery information, including the state of charge, battery temperature, battery age, average temperature history, current depth of discharge, cumulative depth of discharge, cumulative amp-hour throughput, and other factors. Furthermore, the control system 15 may compel engine operation when the temperature of the ESD 60 exceeds a preset threshold. Furthermore, the control system 15 may compel engine operation to provide cabin heating at low ambient temperature conditions, to meet operator expectations for comfort. Furthermore, the control system 15 may compel engine operation to provide system cooling and protect components from overheating, such as the first and second electric machines 40 and 50 and the inverter module 45. Furthermore, the control system 15 may compel engine operation periodically in accordance with a predetermined schedule to systematically exercise engine components. This includes operating the engine and engine subsystems, e.g., a fuel system (not shown) to lubricate base engine parts, e.g., pistons and bearings, and cycle the actuators to prevent degradation due to lack of use. Furthermore, the control system 15 may compel engine operation to warm up the exhaust aftertreatment in a controlled manner to achieve or maintain temperature of an exhaust aftertreatment device (not shown).

After it is determined whether engine operation is compelled, it is then determined whether the preferred operating strategy comprises an electric vehicle range maximization strategy (hereafter 'EV range maximization strategy') (212, 230). The EV range maximization strategy operates to maximize range capability in one of the EV operating states, for example subsequent to operating the vehicle in a geographic region whereat operation of the engine 20 is permissible. The EV range maximization strategy is executed, and one of the EV operating states is subsequently activated as further described herein below. When the EV range maximization strategy is activated, the control system 15 sets a preferred charge/discharge rate to compel engine operation to charge the ESD 60 at a maximum charge rate such that the state of charge of the ESD 60 exceeds a predetermined minimum state of charge and is within an allowable range, while meeting all operator commands for torque and auxiliary functions (228, 232). Therefore, the EV range maximization strategy includes operation of the engine and charging of the ESD 60 and may be accomplished in powertrain operating states that are not purely electric vehicle operating states (i.e. operating states wherein the engine state is OFF) and include series or parallel hybrid powertrain configurations with appropriate power splits to ensure driveline torque requirements are met, auxiliary power functions are met, and the preferred charge rate is met. One having ordinary skill in the art will therefore appreciate that the electric charging operating states and the electrically variable transmission operating states of the embodiments illustrated in FIGS. 1 and 2 may be employed in carrying out the EV range maximization strategy. Similarly, one having ordinary skill in the art will appreciate that alternative powertrain configurations that include fixed gear operating states, such as described herein below with respect to the embodiments of FIGS. 4-6, may also be employed in carrying out the EV range maximization strategy. One having ordinary skill in the art will therefore appreciate that in carrying out the EV range maximization strategy, the powertrain operating state will include an engine state of ON. When the ESD 60 achieves a state of charge within the allowable range, preferably corresponding to a relatively high state of charge, the control system 15 maintains the ESD 60 at that state of charge until either the EV range maximization strategy is deactivated or operation in one of the EV operating states is initiated, either by an input by the vehicle operator to the operator interface device 18, or by other action related to the vehicle operation. This may or may not dictate that the engine 20 remains constantly on, depending on the preferred charge rate and the vehicle drive schedule in process. As used herein, the terms charge rate and charge/discharge rate refer to a time-based rate of electric power flow into or out of the ESD 60, preferably in amp-hours.

The EV range maximization strategy can be activated automatically for example when an incipient electric vehicle operating state is determined. For example, EV range maximization strategy may be activated when the vehicle is proximal to and approaching a geographic area where vehicles are restricted to EV-only operation, using information from the GPS system and map information which may be made available a priori or obtained via a wireless network while the vehicle is operating. Alternately, the vehicle operator may select and designate one or more geographic areas as desirable for EV operation via input to the operator interface device 18. Alternately, EV range maximization strategy may be activated if a preset drive path is known which includes portions of required or desired EV-only operation. Alternately, the vehicle operator may select the EV range maximization strategy via input to the operator interface device 18 indicating a preference for operating in the EV operating state, causing the control system 15 to activate the EV range maximization strategy prior to operating in the EV operating state. The EV range maximization strategy is then activated preceding entry into the areas of EV operation or in anticipation of the electric vehicle operating state to achieve a state of charge of the ESD 60 effective to permit operation using a charge depletion operating strategy subsequent thereto.

When the engine 20 is not compelled to operate, and the EV range maximization strategy is not indicated, it is determined whether the charge depletion operating strategy is permitted (214). The control system 15 determines whether there are operating conditions which prevent depleting the charge of the ESD 60. This includes monitoring health and performance of the ESD 60. For example, the charge depletion operating strategy is not permitted whenever the available power and/or energy from the ESD 60 fall below a preset threshold. The BPCM 62 estimates the available power and energy from the ESD 60 based on battery information including the state of charge, battery temperature, battery age, average temperature history, current depth of discharge, cumulative depth of discharge, and cumulative amp-hour throughput.

When the charge depletion operating strategy is permitted, it is determined whether engine-off operation is preferred (216). The control system 15 monitors and reviews conditions which prevent the engine 20 from being compelled to operate by the control system 15. These conditions include a default powertrain operating state, wherein the default powertrain operating state comprises operating in one of the EV operating states until the state of charge of the ESD 60 falls below a threshold, i.e., the ESD 60 has been depleted. The vehicle operator may select the EV operating state as a preferred powertrain operating state using an on-board input device, e.g., selecting EV operation using to the operator interface device 18. The control system 15 may activate one of the EV operating states and engine-off operation based upon input from the GPS system to the operator interface device 18, when the vehicle approaches a geographic area where vehicles are restricted to EV-only operation. Alternately, the operator may select and designate specific areas as desired for EV-only operation, utilizing the GPS system and on-board electronic maps made available a priori or obtained via a wireless network while the vehicle is operating. Alternately, the control system 15 may activate one of the EV operating states based upon the operator executing a preset drive path, including portions which have required or desired EV-only operation. When the control system 15 determines the EV operating state is preferred, the engine state is set to OFF, and the engine is shutdown or continues to be shutdown when it is already shutdown (220).

The charge depletion operating strategy is refined to include a preferred charge/discharge rate for the ESD 60, when engine operation is permitted during a portion of a trip (218). This includes determining the preferred charge/discharge rate for the ESD 60, when engine operation is compelled during a portion of the trip (234). The preferred charge/discharge rate is determined based upon the operating conditions, including information related to the current trip and the driving style of the operator. The operator inputs information into the operator interface device 18 related to the current trip, including, e.g., distance or destination. The control system 15 monitors and determines the operator's driving style to optimize the rate of charge depletion of the ESD 60. The information is preferably organized in a hierarchical fashion wherein more specific information permits alteration of the drive strategy to improve performance. There is a base charge/discharge calibration, which includes a minimum discharge rate for depletion of electric power. The minimum discharge rate is used by the control system 15 as the preferred charge/discharge rate in the absence of other information. The minimum discharge rate may minimize fuel usage and/or operator cost for an expected distribution of trip distances and driving styles. The minimum discharge rate may be developed based on a statistical description of vehicle trips in the target vehicle market.

As the vehicle is repeatedly operated, the driving pattern for a specifically identifiable trip may be characterized statistically in terms of speed, acceleration, and number of stops. Alternately, the operator may select a drive mode via the user input, comprising, for example, one of city, downtown, rush hour, and cruising mode, with a corresponding preferred charge/discharge rate that is determined for the selected drive mode. Additionally, elevation information as determined either from GPS data or from sensors may be used to determine whether the terrain is hilly or flat. From this information, the minimum discharge rate may be modified, for example, to reduce fuel usage for the driving pattern in use.

In operation, the control system 15 may identify whether a specifically identifiable trip in progress. If the specific trip is known, the preferred charge/discharge rate may be optimized at various points in the trip to minimize the fuel usage or operating cost. If trip elevation vs. distance is known, this information may be used to optimize the capture of potential regenerative braking energy during operation of the vehicle. The control system 15 determines a preferred charge/discharge rate comprising a charge depletion rate which accounts for the following factors, when known: trip speed vs. distance, total trip length, expected future recharge behavior at end of the trip, and, the trip elevation vs. distance. Various methods may be used to identify occurrence of the specific trip, to permit the control system 15 to monitor and capture information about the trip. This includes the operator entering trip distance via the operator interface device 18; the operator identifying a specific trip, including selection from preset list of stored trips, or waypoint identification; the control system 15 matching occurrence of a trip using GPS information; or using information related to speed acceleration, time and, distance. Furthermore, under conditions wherein the vehicle deviates from expected trip behavior, preferred charge/discharge rate may be adjusted to take the deviation into account. Such deviations include, e.g., mismatches between expected and actual speeds, deviations from an expected trip route, and real-time traffic information. In this manner, the baseline or default preferred charge/discharge rate represents a minimum expected performance. Vehicle performance is anticipated to improve from the base charge/discharge rate after a period of learning and adaptation.

When the engine 20 is not compelled to operate, and the EV range maximization strategy is not activated, and the charge depletion operating strategy is not permitted, a charge sustaining operating strategy is selected, which comprises setting the preferred charge/discharge rate to a value that causes the average SOC to track a desired target value (222). When the preferred charge/discharge rate is set to zero, the control system 15 controls operation of the powertrain system 10 so that the average state of charge of the ESD 60 is within measurement error of the desired target SOC and within a predetermined level of hysteresis to prevent engine cycling. The desired target SOC need not be a fixed value and may vary during the course of vehicle operation taking into account factors such as expected demand for and battery capability for delivering power and energy, expected supply of regenerative braking energy due to terrain and/or recharge opportunity, and to minimize the long term exposure of the battery pack to states of charge that cause increased rate of degradation or wearout. The engine 20 and the first and second electric machines 40 and 50 are controlled to generate electric power and torque to minimize system losses while maintaining the state of charge of the ESD 60 (224, 226).

When the preferred charge/discharge rate is determined, e.g., at any one of (218, 222, 228) the optimal engine state is determined to minimize system power loss (224). This includes determining whether the powertrain operating state includes the engine state as OFF or the engine state as ON, based upon the charge/discharge rate, the conditions of the ESD 60, and other factors.

The control system 15 determines an optimal operating point at which to control the powertrain system 10 to generate the tractive torque which is transmitted to the driveline 90, to generate power which is transmitted to the first electric machine 40 to generate electric power, and to regeneratively brake the vehicle and generate electric power thereby. This includes determining and controlling speed and torque outputs from the engine 20 and the first and second electric machines 40 and 50 to meet the operator torque request and any requirements for charging the ESD 60, and to minimize energy usage and power loss in the powertrain system 10 when controlled to the selected powertrain operating state, based upon the operator demands, powertrain states, and operating conditions (226). This operation includes selecting a preferred one of the available powertrain operating states, including, e.g., an electric vehicle operating state, an electrically variable transmission operating state, an electric vehicle operating state with electric charging, a charging operating state, a fixed gear operating state, and a neutral/charging operating state, depending upon the specific embodiment of the powertrain system 10 employed. Additional operating conditions taken into account include available electrical energy from the ESD 60. The available electrical energy in the ESD 60 is taken into account in order to minimize the probability that the ESD 60 is not discharged below a predetermined minimum state of charge prior to a subsequent charging opportunity. Available electrical energy is determined in the BPCM 62 based on the state of charge, the battery temperature, the battery age, the average temperature history, the current depth of discharge, the cumulative depth of discharge, and the cumulative amp-hour throughput. Vehicle energy usage includes estimated rolling losses and road loads, which may be monitored and taken into account to modify a projected rate of energy usage. Furthermore, the system may use fuel cost information in order to select the most cost effective control between combustible fuel and electricity. The fuel and electricity costs may be determined based on location, or manually entered, or updated via communication with the vehicle from external sources.

Figure 4:
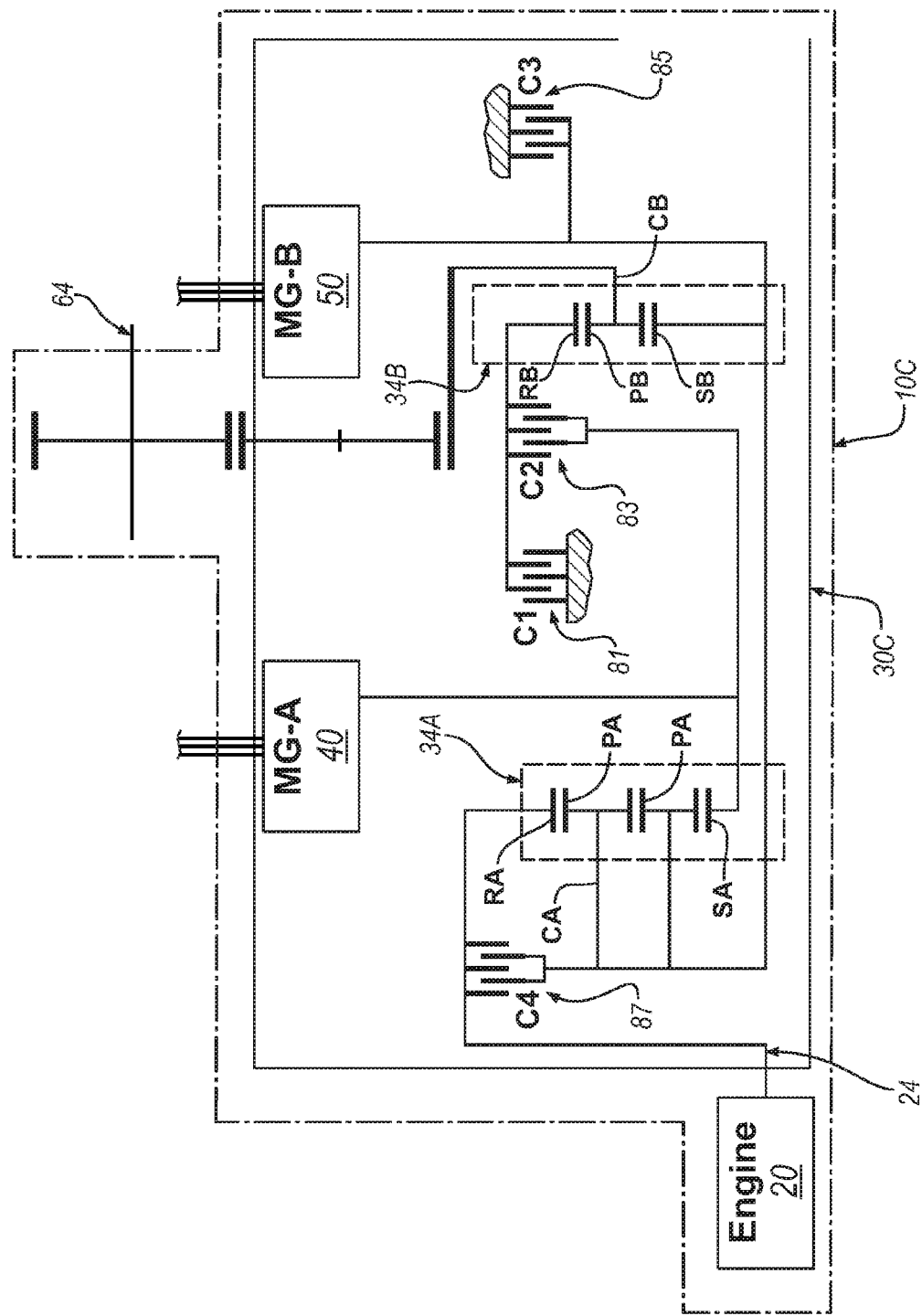
FIGS. 4, 5 and 6 are schematic diagrams of exemplary powertrain systems, in accordance with the present disclosure.

FIG. 4 depicts another embodiment of a powertrain system 10C including the engine 20, and an electro-mechanical transmission 30C including first and second electric machines 40 and 50, a first planetary gear set 34A, a second planetary gear 34B, and selectively engageable clutches C1 81, C2 83, C3 85, and C4 87. A first gear member of the gearset 34A, a sun gear SA in the present embodiment, is connected to the first electric machine 40. A second gear member of the gearset 34A, a ring gear RA in the present embodiment, is connected to the transmission input member 24 which in turn is connected to the engine 20. A third gear member of the gearset 34A, a double-pinion planet carrier CA connected to dual-planetary gears PA in the present embodiment, is connected to the second electric machine 50 and a first gear member of the gearset 34B, a sun gear SB in the present embodiment. A second gear member of the gearset 34B, a planet carrier CB connected to planetary gears PB in the present embodiment, is connected to the transmission output member 64. A third gear member of the gearset 34B, a ring gear in the present embodiment, may be selectively connected to the transmission case (i.e. grounded) via clutch C1 81. The third gear member of the gearset 34B may be selectively connected to the first gear member of the gearset 34A (sun gear SA in the present embodiment) and the first electric machine 40 via clutch C2 83. The second electric machine 50 and the first gear member of the gearset 34B (sun gear SB in the present embodiment) may be selectively connected the transmission case (i.e. grounded) via clutch C3 85. The second gear member of the gearset 34A (ring gear RA in the present embodiment) and the transmission input member 24 (which in turn is connected to the engine 20) may be selectively connected to the third gear member of the gearset 34A (double-pinion planet carrier CA connected to dual-planetary gears PA in the present embodiment) and to the second electric machine 50 and the first gear member of the gearset 34B (sun gear SB in the present embodiment) via clutch C4 87.

The powertrain system 10C depicted with reference to FIG. 4 is selectively operative in one of several powertrain operating states by controlling the engine state and operating the first and second electric machines 40 and 50 to generate tractive torque which can be transmitted to the driveline 90 via the transmission output member 64 through selectively applied clutches, as detailed in Table 3.

TABLE 3

| Powertrain Operating State | Clutch Applied | Tractive Torque Generator | Engine State |
|---|---|---|---|
| EV1 | C1 | second electric machine | OFF |
| EV2 | C2 | first and second electric machines | OFF |
| EVT1 | C1 | engine and second electric machine | ON |
| EVT2 | C2 | engine, first and second electric machines | ON |
| FG1 | C1, C4 | engine, first and second electric machines | ON |
| FG2 | C1, C2 | engine and second electric machine | ON |
| FG3 | C2, C4 | engine, first and second electric machines | ON |
| FG4 | C2, C3 | engine and first electric machine | ON |
| Neutral/Charging | None | none | ON or OFF |

In a first electric vehicle ('EV1') operating state, the second electric machine 50 generates the tractive torque, and the engine state is OFF. In a second electric vehicle ('EV2') operating state, the first and second electric machines 40 and 50 generate the tractive torque, and the engine state is OFF. In a first electrically variable transmission ('EVT1') operating state, the engine state is ON, and the engine 20 and the second electric machine 50 predominantly generate the tractive torque, although one having ordinary skill in the art will recognize that the first electric machine 40 may provide a reaction torque contributing to the tractive torque. In a second electrically variable transmission ('EVT2') operating state, the engine state is ON, and the engine 20 and the first and second electric machines 40 and 50 generate the tractive torque. In a first fixed gear operating state ('FG1') the engine 20 and the first and second electric machines 40 and 50 generate the tractive torque. In a second fixed gear operating state ('FG2') the engine 20 and the second electric machine 50 predominantly generate the tractive torque. In a third fixed gear operating state ('FG3') the engine 20 and the first and second electric machines 40 and 50 generate the tractive torque. In a fourth fixed gear operating state ('FG4') the engine 20 and the first electric machine 40 predominantly generate the tractive torque. In each of the first, second, third, and fourth fixed gear operating states, speed of the transmission output member 64 directly corresponds to the engine speed and the fixed gear ratio. The engine 20 may generate power for charging the ESD 60 through the first electric machine 40 during any of the operating states when the engine state is ON. In a neutral/charging operating state, the engine state can be ON, with the engine 20 generating power for charging the ESD 60 through the first electric machine 40, and disconnected from the driveline 90, i.e., no tractive torque is transmitted to the driveline 90 from the engine 20. Furthermore, the first electrical machine 40 can be controlled to start the engine 20 in any of the powertrain operating states in which the engine state can be ON. Electrical power can be regenerated during braking or coasting events, regardless of the powertrain operating state.

Figure 5:
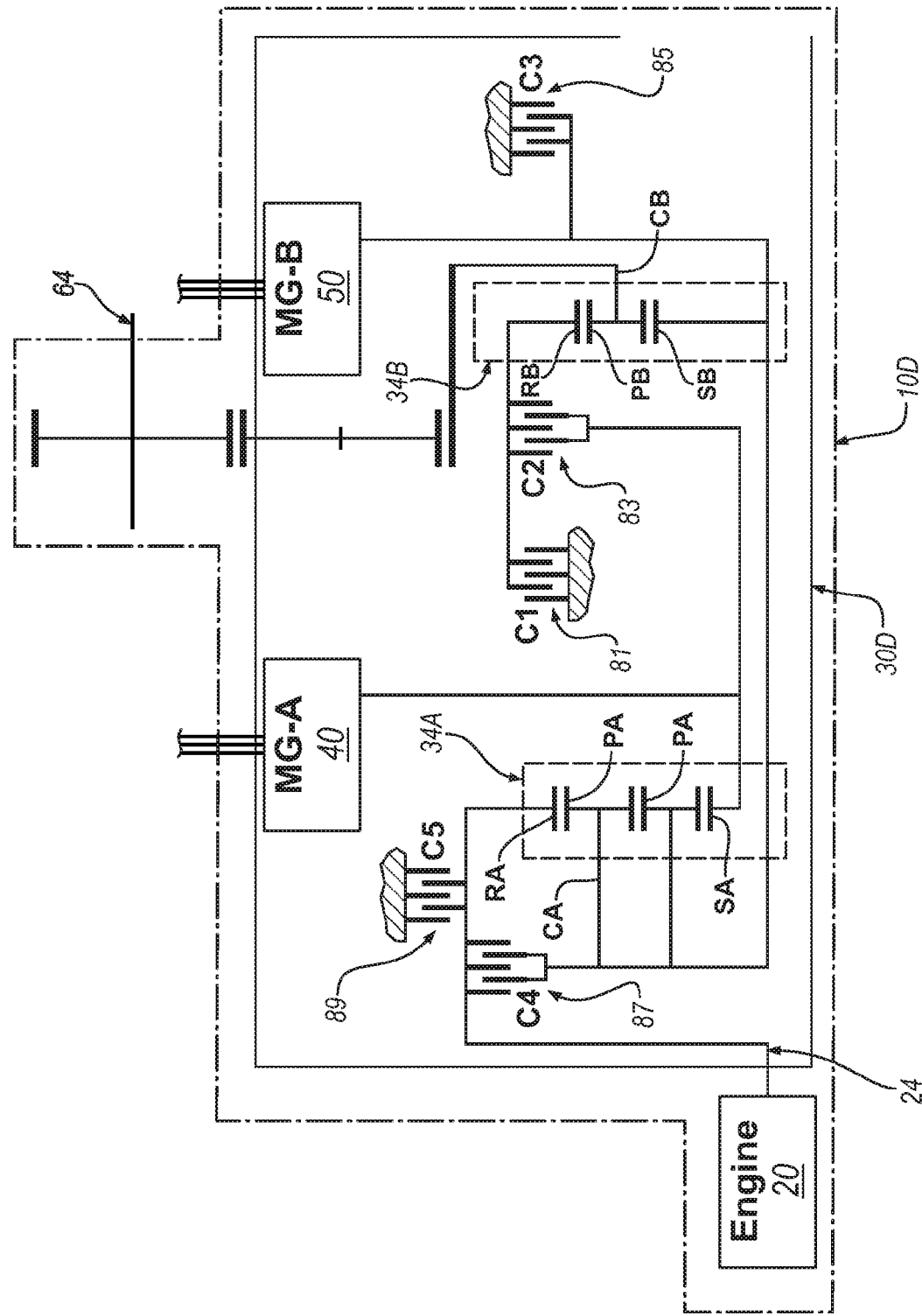

FIG. 5 depicts another embodiment of a powertrain system 10D including the engine 20, and an electro-mechanical transmission 30D including first and second electric machines 40 and 50, a first planetary gear set 34A, a second planetary gear 34B, and selectively engageable clutches C1 81, C2 83, C3 85, C4 87, and C5 89. A first gear member of the gearset 34A, a sun gear SA in the present embodiment, is connected to the first electric machine 40. A second gear member of the gearset 34A, a ring gear RA in the present embodiment, is connected to the transmission input member 24 which in turn is connected to the engine 20. A third gear member of the gearset 34A, a double-pinion planet carrier CA connected to dual-planetary gears PA in the present embodiment, is connected to the second electric machine 50 and a first gear member of the gearset 34B, a sun gear SB in the present embodiment. A second gear member of the gearset 34B, a planet carrier CB connected to planetary gears PB in the present embodiment, is connected to the transmission output member 64. A third gear member of the gearset 34B, a ring gear in the present embodiment, may be selectively connected to the transmission case (i.e. grounded) via clutch C1 81. The third gear member of the gearset 34B may be selectively connected to the first gear member of the gearset 34A (sun gear SA in the present embodiment) and the first electric machine 40 via clutch C2 83. The second electric machine 50 and the first gear member of the gearset 34B (sun gear SB in the present embodiment) may be selectively connected the transmission case (i.e. grounded) via clutch C3 85. The second gear member of the gearset 34A (ring gear RA in the present embodiment) and the transmission input member 24 (which in turn is connected to the engine 20) may be selectively connected to the third gear member of the gearset 34A (double-pinion planet carrier CA connected to dual-planetary gears PA in the present embodiment) and to the second electric machine 50 and the first gear member of the gearset 34B (sun gear SB in the present embodiment) via clutch C4 87. The second gear member of the gearset 34A (ring gear RA in the present embodiment) and the transmission input member 24 (which in turn is connected to the engine 20) may be selectively connected to the transmission case (i.e. grounded) via clutch C5 89.

The powertrain system 10D depicted with reference to FIG. 5 is selectively operative in one of several powertrain operating states by controlling the engine state and operating the first and second electric machines 40 and 50 to generate tractive torque which can be transmitted to the driveline 90 via the transmission output member 64 through selectively applied clutches, as detailed in Table 4.

TABLE 4

| Powertrain Operating State | Clutch Applied | Tractive Torque Generator | Engine State |
|---|---|---|---|
| EV1 | C1, C5 | first and second electric machines | OFF |
| EV2 | C2, C5 | first and second electric machines | OFF |
| EVT1 | C1 | engine and second electric machine | ON |
| EVT2 | C2 | engine, first and second electric machines | ON |
| FG1 | C1, C4 | engine, first and second electric machines | ON |
| FG2 | C1, C2 | engine and second electric machine | ON |
| FG3 | C2, C4 | engine, first and second electric machines | ON |

TABLE 4-continued

| Powertrain Operating State | Clutch Applied | Tractive Torque Generator | Engine State |
|---|---|---|---|
| FG4 | C2, C3 | engine and first electric machine | ON |
| Neutral/Charging | None | none | ON or OFF |

In a first electric vehicle ('EV1') operating state, the second electric machine 50 generates the tractive torque, and the engine state is OFF. In a second electric vehicle ('EV2') operating state, the first and second electric machines 40 and 50 generate the tractive torque, and the engine state is OFF. In a first electrically variable transmission ('EVT1') operating state, the engine state is ON, and the engine 20 and the second electric machine 50 predominantly generate the tractive torque, although one having ordinary skill in the art will recognize that the first electric machine 40 may provide a reaction torque contributing to the tractive torque. In a second electrically variable transmission ('EVT2') operating state, the engine state is ON, and the engine 20 and the first and second electric machines 40 and 50 generate the tractive torque. In a first fixed gear operating state ('FG1') the engine 20 and the first and second electric machines 40 and 50 generate the tractive torque. In a second fixed gear operating state ('FG2') the engine 20 and the second electric machine 50 predominantly generate the tractive torque. In a third fixed gear operating state ('FG3') the engine 20 and the first and second electric machines 40 and 50 generate the tractive torque. In a fourth fixed gear operating state ('FG4') the engine 20 and the first electric machine 40 predominantly generate the tractive torque. In each of the first, second, third, and fourth fixed gear operating states, speed of the transmission output member 64 directly corresponds to the engine speed and the fixed gear ratio. The engine 20 may generate power for charging the ESD 60 through the first electric machine 40 during any of the operating states when the engine state is ON. In a neutral/charging operating state, the engine state can be ON, with the engine 20 generating power for charging the ESD 60 through the first electric machine 40, and disconnected from the driveline 90, i.e., no tractive torque is transmitted to the driveline 90 from the engine 20. Furthermore, the first electrical machine 40 can be controlled to start the engine 20 in any of the powertrain operating states in which the engine state can be ON. Electrical power can be regenerated during braking or coasting events, regardless of the powertrain operating state.

Figure 6:
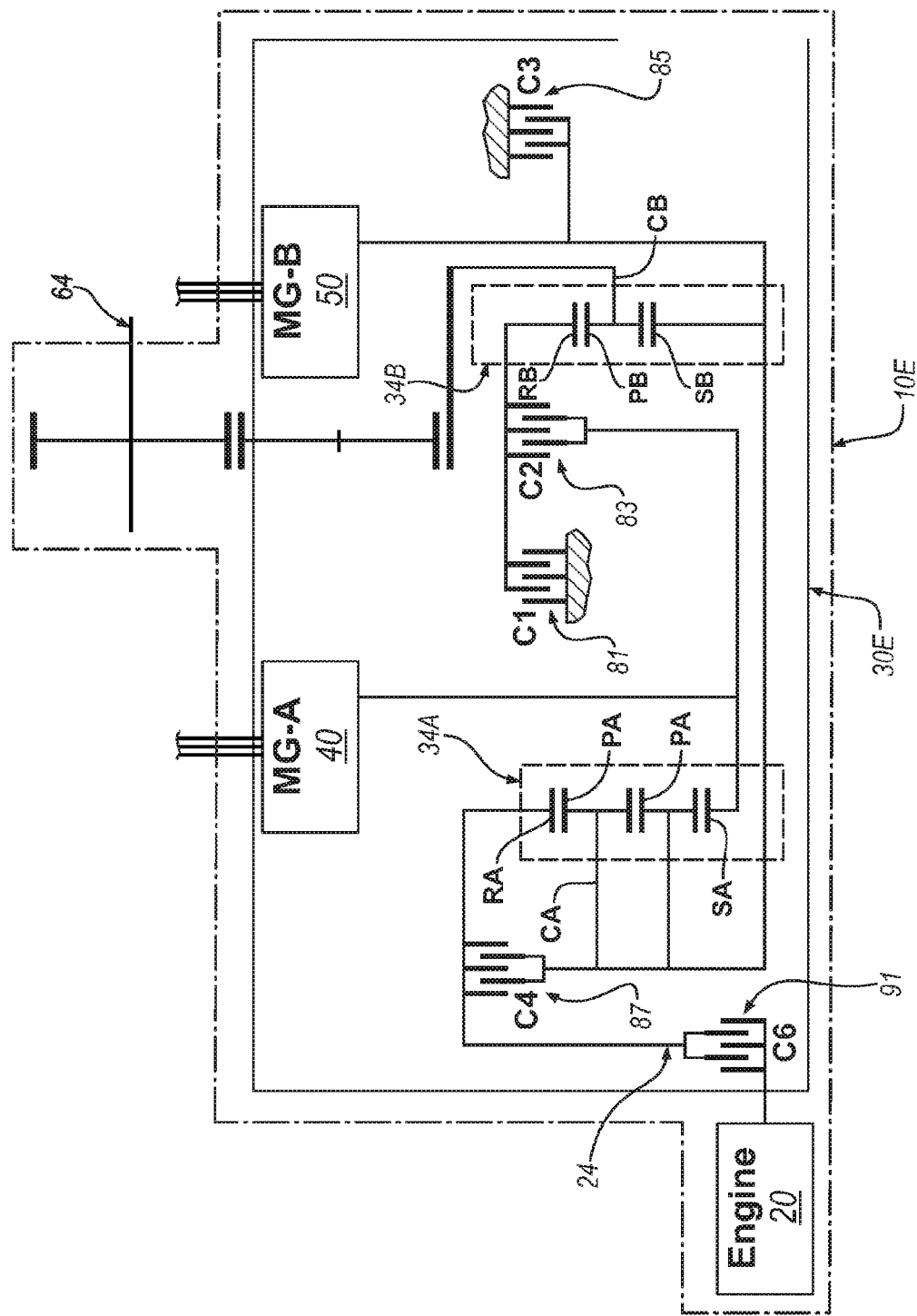

FIG. 6 depicts another embodiment of a powertrain system 10E including the engine 20, and an electro-mechanical transmission 30E including first and second electric machines 40 and 50, a first planetary gear set 34A, a second planetary gear 34B, and selectively engageable clutches C1 81, C2 83, C3 85, C4 87, and C6 91. A first gear member of the gearset 34A, a sun gear SA in the present embodiment, is connected to the first electric machine 40. A second gear member of the gearset 34A, a ring gear RA in the present embodiment, may be selectively connected to the transmission input member 24 and a third gear member of the gearset 34A as described further herein below. The third gear member of the gearset 34A, a double-pinion planet carrier CA connected to dual-planetary gears PA in the present embodiment, is connected to the second electric machine 50 and a first gear member of the gearset 34B, a sun gear SB in the present embodiment. A second gear member of the gearset 34B, a planet carrier CB connected to planetary gears PB in the present embodiment, is connected to the transmission output member 64. A third gear member of the gearset 34B, a ring gear in the present embodiment, may be selectively connected to the transmission case (i.e. grounded) via clutch C1 81. The third gear member of the gearset 34B may be selectively connected to the first gear member of the gearset 34A (sun gear SA in the present embodiment) and the first electric machine 40 via clutch C2 83. The second electric machine 50 and the first gear member of the gearset 34B (sun gear SB in the present embodiment) may be selectively connected the transmission case (i.e. grounded) via clutch C3 85. The second gear member of the gearset 34A (ring gear RA in the present embodiment) may be selectively connected to the transmission input member 24 which in turn is connected to the engine 20 via clutch C6 91. The second gear member of the gearset 34A (ring gear RA in the present embodiment) may be selectively connected to the third gear member of the gearset 34A (double-pinion planet carrier CA connected to dual-planetary gears PA in the present embodiment) and to the second electric machine 50 and the first gear member of the gearset 34B (sun gear SB in the present embodiment) via clutch C4 87.

The powertrain system 10E depicted with reference to FIG. 6 is selectively operative in one of several powertrain operating states by controlling the engine state and operating the first and second electric machines 40 and 50 to generate tractive torque which can be transmitted to the driveline 90 via the transmission output member 64 through selectively applied clutches, as detailed in Table 5.

TABLE 5

| Powertrain Operating State | Clutch Applied | Tractive Torque Generator | Engine State |
| --- | --- | --- | --- |
| EV1 | C1, C6 | second electric machine | OFF |
| EV2 | C2, C6 | first and second electric machines | OFF |
| EV3 | C1, C4 | first and second electric machines | OFF |
| EV4 | C2, C4 | first and second electric machines | OFF |
| EVT1 | C1, C6 | engine and second electric machine | ON |
| EVT2 | C2, C6 | engine, first and second electric machines | ON |
| FG1 | C1, C4, C6 | engine, first and second electric machines | ON |
| FG2 | C1, C2, C6 | engine and second electric machine | ON |
| FG3 | C2, C4, C6 | engine, first and second electric machines | ON |
| FG4 | C2, C3, C6 | engine and first electric machine | ON |
| Neutral/Charging | C6 | none | ON or OFF |

In a first electric vehicle ('EV1') operating state, the second electric machine 50 generates the tractive torque, and the engine state is OFF. In a second electric vehicle ('EV2') operating state, the first and second electric machines 40 and 50 generate the tractive torque, and the engine state is OFF. In a third electric vehicle ('EV3') operating state, the first and second electric machines 40 and 50 generate the tractive torque, and the engine state is OFF. In a fourth electric vehicle ('EV4') operating state, the first and second electric machines 40 and 50 generate the tractive torque, and the engine state is OFF. In a first electrically variable transmission ('EVT1') operating state, the engine state is ON, and the engine 20 and the second electric machine 50 predominantly generate the tractive torque, although one having ordinary skill in the art will recognize that the first electric machine 40 may provide a reaction torque contributing to the tractive torque. In a second electrically variable transmission ('EVT2') operating state, the engine state is ON, and the engine 20 and the first and second electric machines 40 and 50 generate the tractive torque. In a first fixed gear operating state ('FG1') the engine 20 and the first and second electric machines 40 and 50 generate the tractive torque. In a second fixed gear operating state ('FG2') the engine 20 and the second electric machine 50 predominantly generate the tractive torque. In a third fixed gear operating state ('FG3') the engine 20 and the first and second electric machines 40 and 50 generate the tractive torque. In a fourth fixed gear operating state ('FG4') the engine 20 and the first electric machine 40 predominantly generate the tractive torque. In each of the first, second, third, and fourth fixed gear operating states, speed of the transmission output member 64 directly corresponds to the engine speed and the fixed gear ratio. The engine 20 may generate power for charging the ESD 60 through the first electric machine 40 during any of the operating states when the engine state is ON. In a neutral/charging operating state, the engine state can be ON, with the engine 20 generating power for charging the ESD 60 through the first electric machine 40, and disconnected from the driveline 90, i.e., no tractive torque is transmitted to the driveline 90 from the engine 20. Furthermore, the first electrical machine 40 can be controlled to start the engine 20 in any of the powertrain operating states in which the engine state can be ON. Electrical power can be regenerated during braking or coasting events, regardless of the powertrain operating state.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for maximizing range capability of a vehicle while operating in an electric vehicle operating state, said vehicle including a powertrain including an engine and at least one electric machine, the method comprising:
   determining an incipient electric vehicle operating state of the powertrain;
   setting a preferred charge/discharge rate of an electric energy storage device to a maximum charging rate; and
   controlling the powertrain to an operating state including an engine state that is ON to effect charging the electrical energy storage device based on the maximum charging rate.

2. The method of claim 1 wherein controlling the powertrain to an operating state including an engine state that is ON comprises controlling the powertrain to one of an electrically variable transmission operating state, an electric vehicle with charging operating state, and a fixed gear operating state.

3. The method of claim 1, wherein controlling the powertrain to an operating state including an engine state that is ON comprises selectively configuring the powertrain as a series hybrid powertrain.

4. The method of claim 1, wherein controlling the powertrain to an operating state including an engine state that is ON comprises selectively configuring the powertrain as a parallel hybrid powertrain.

5. The method of claim 1, wherein determining an incipient electric vehicle operating state of the powertrain is based upon proximity of the vehicle to a predetermined geographic area.

6. The powertrain system of claim 5, wherein proximity to the predetermined geographic area is based upon input from an on-board global positioning system.

7. The powertrain system of claim 5, wherein the predetermined geographic area comprises an area whereat powertrain operating states are restricted to an electric vehicle operating state.

8. The powertrain system of claim 5, wherein the predetermined geographic area comprises an area identified by an operator.

9. A powertrain system for a vehicle, comprising:
an engine;
an electrical energy storage system including an electrical energy storage device selectively electrically coupled to a remote electric power source;
a transmission including a transmission input member operatively connected to the engine, a first electric machine operatively connected to a transmission output member, a second electric machine operatively connected to the transmission input member, said first and second electric machines electrically-operatively coupled to the electrical energy storage system; and
a control system implementing an electric vehicle range maximization strategy comprising
a) setting a preferred charge/discharge rate to a maximum charging rate, and
b) controlling the powertrain to an electric vehicle with electric charging operating state to charge the electrical energy storage device based on the maximum charging rate.

10. The powertrain system of claim 9, wherein the powertrain system is permanently configured as a series hybrid powertrain.

11. The powertrain system of claim 9, wherein the powertrain is selectively configured as a series hybrid powertrain.

12. The powertrain system of claim 9, wherein the transmission further comprises:
a transmission case;
a first selectively engageable torque transfer device between said first gear member of said first planetary gear set and said transmission case,
a second selectively engageable torque transfer device between said first gear member of said first planetary gear set and said first electric machine,
a third selectively engageable torque transfer device operable when engaged to connect said first electric machine and said transmission input member,
a transmission output member connected to said second gear member of said first planetary gear set, and
said second electric machine connected to said third gear member of said first planetary gear set.

13. The powertrain system of claim 12, wherein the control system implementing an electric vehicle range maximization strategy comprising controlling the powertrain to the electric vehicle with electric charging operating state comprises:
controlling said first selectively engageable torque transfer device engaged, said second selectively engageable torque transfer device disengaged, and said third selectively engageable torque transfer device engaged.

14. The powertrain system of claim 12, wherein the control system implementing an electric vehicle range maximization strategy comprising controlling the powertrain to the electric vehicle with electric charging operating state comprises:
controlling said first selectively engageable torque transfer device disengaged, and said second and third selectively engageable torque transfer devices engaged.

15. The powertrain system of claim 12, wherein the transmission further comprises:
a second planetary gear set including respective first, second and third gear members;
said transmission input member connected to said first gear member of said second planetary gear set;
said second gear member of said second planetary gear set connected to said first electric machine; and
said third selectively engageable torque transfer device between said third planetary gear set member of said second planetary gear set and said transmission input member.

16. The powertrain system of claim 15, wherein the control system implementing an electric vehicle range maximization strategy comprising controlling the powertrain to the electric vehicle with electric charging operating state comprises:
controlling said first selectively engageable torque transfer device engaged, and said second and third selectively engageable torque transfer devices disengaged.

17. The powertrain system of claim 15, wherein the control system implementing an electric vehicle range maximization strategy comprising controlling the powertrain to the electric vehicle with electric charging operating state comprises:
controlling said first selectively engageable torque transfer device disengaged, said second selectively engageable torque transfer devices engaged, and said third selectively engageable torque transfer device disengaged.

18. The powertrain system of claim 15, wherein the control system implementing an electric vehicle range maximization strategy comprising controlling the powertrain to the electric vehicle with electric charging operating state comprises:
controlling said first and second selectively engageable torque transfer devices engaged, and said third selectively engageable torque transfer device disengaged.

19. The powertrain system of claim 15, wherein the control system implementing an electric vehicle range maximization strategy comprising controlling the powertrain to the electric vehicle with electric charging operating state comprises:
controlling said first selectively engageable torque transfer device disengaged, and said second and third selectively engageable torque transfer devices engaged.

20. The powertrain system of claim 9, wherein the electric vehicle range maximization strategy is implemented based upon proximity of the vehicle to a predetermined geographic area.

21. The powertrain system of claim 9, wherein:
the control system further implements a charge sustaining operating strategy subsequent to the state of charge of the electrical energy storage device achieving a predetermined range.

22. The powertrain system of claim 9 wherein:
the control system further implements a charge depleting operating strategy subsequent to implementing the electric vehicle range maximization strategy comprising controlling the powertrain to an electric vehicle operating state based on one of an operator demand and proximity of the vehicle to a predetermined geographic area.

23. The powertrain system of claim 21, wherein:
the control system further implements a charge depleting operating strategy subsequent to implementing the charge sustaining operating strategy comprising controlling the powertrain to an electric vehicle operating state based on one of an operator demand and proximity of the vehicle to a predetermined geographic area.

* * * * *